United States Patent
Casanova

(10) Patent No.: US 10,847,962 B2
(45) Date of Patent: Nov. 24, 2020

(54) CABLE GLAND COMPRISING A SLIP ON GROMMET

(71) Applicant: Huber+Suhner AG, Herisau (CH)

(72) Inventor: Reto Casanova, Pfäffikon (CH)

(73) Assignee: Huber+Suhner AG

( * ) Notice: Subject to any disclaimer, the term of this patent is extended or adjusted under 35 U.S.C. 154(b) by 0 days.

(21) Appl. No.: 16/342,493

(22) PCT Filed: Oct. 4, 2017

(86) PCT No.: PCT/EP2017/075184
§ 371 (c)(1),
(2) Date: Apr. 16, 2019

(87) PCT Pub. No.: WO2018/073001
PCT Pub. Date: Apr. 26, 2018

(65) Prior Publication Data
US 2019/0252870 A1 Aug. 15, 2019

(30) Foreign Application Priority Data
Oct. 17, 2016 (CH) ...................................... 1386/16

(51) Int. Cl.
*H02G 3/22* (2006.01)
*F16L 5/00* (2006.01)
(Continued)

(52) U.S. Cl.
CPC ........... *H02G 15/046* (2013.01); *B61C 17/00* (2013.01)

(58) Field of Classification Search
CPC ... Y10T 16/05; Y10T 16/063; B60R 16/0222; B60R 16/0207; B60R 16/0215;
(Continued)

(56) References Cited

U.S. PATENT DOCUMENTS 4,287,386 A * 9/1981 Scahill ................. H02G 15/046
174/76
4,385,777 A * 5/1983 Logsdon ................... F16L 5/10
16/2.1

(Continued)

FOREIGN PATENT DOCUMENTS

| CN | 202034495 | 11/2011 |
| CN | 203589674 | 5/2014 |
| FR | 2724750 A1 | 9/1994 |

OTHER PUBLICATIONS

International Search Report and Written Opinion dated Dec. 5, 2017 issued in connection with International Application No. PCT/EP2017/075184, filed on Oct. 4, 2017, 7 pages.

(Continued)

*Primary Examiner* — Chuck Y Mah
(74) *Attorney, Agent, or Firm* — McDonnell Boehnen Hulbert & Berghoff LLP

(57) ABSTRACT

The invention relates to a cable gland with a grommet comprising a tubular base body made from an elastic material and extending in a direction of a cable gland axis from a first outer end to a second outer end. The tubular base body has at least one flow channel arranged between the first and the second outer end and extending in circumferential direction along an inner surface of the tubular base body. At least one filling hole extends from said flow channel radially outwards through the tubular base body to fill an inner space of the tubular base body with an adhesive. A first circumferential sealing lip arranged in the region of the first outer end and a second circumferential sealing lip arranged in the region of the second outer end to seal an inner space of the tubular base body when mounted on a cable with respect to the cable.

17 Claims, 2 Drawing Sheets

(51) Int. Cl.
  *H02G 15/04* (2006.01)
  *B61C 17/00* (2006.01)

(58) Field of Classification Search
  CPC ...... H02G 3/22; H02G 3/0468; H02G 3/0481;
       H02G 15/013; F16L 5/10; F16B 5/0258;
       F16B 43/001; F16B 43/02; F16B 5/126;
       F16B 5/0651; F16B 37/043; H01R
       13/5205; H01R 13/5208; H01B 17/24;
       H01B 17/583; F16F 1/3732
  See application file for complete search history.

(56) References Cited

U.S. PATENT DOCUMENTS

| | | | | |
|---|---|---|---|---|
| 4,500,154 A | * | 2/1985 | Collins | H01R 13/622 |
| | | | | 439/313 |
| 4,607,469 A | * | 8/1986 | Harrison | F16L 5/02 |
| | | | | 138/89 |
| 5,582,074 A | * | 12/1996 | Kelley | F16C 1/103 |
| | | | | 74/502.4 |
| 5,588,858 A | * | 12/1996 | Lester | H01R 13/5208 |
| | | | | 439/275 |
| 7,344,396 B2 | * | 3/2008 | Stagi | H01B 7/285 |
| | | | | 439/204 |
| 7,959,477 B2 | * | 6/2011 | Steele | H02G 15/04 |
| | | | | 439/805 |
| 8,113,878 B2 | * | 2/2012 | Clausen | H01R 24/564 |
| | | | | 439/584 |
| 8,678,858 B2 | * | 3/2014 | Islam | H01R 9/0521 |
| | | | | 439/578 |
| 8,692,139 B2 | * | 4/2014 | Aldrich | H02G 15/013 |
| | | | | 174/653 |
| 8,919,221 B2 | * | 12/2014 | Chiou | F16C 1/102 |
| | | | | 74/502.4 |
| 9,123,453 B2 | * | 9/2015 | Casanova | H01R 9/0527 |
| 9,356,387 B1 | * | 5/2016 | Taylor | H01R 13/5208 |
| 9,368,902 B2 | * | 6/2016 | Nakai | H01R 13/5202 |
| 2010/0062628 A1 | | 3/2010 | Steele et al. | |
| 2014/0090887 A1 | | 4/2014 | Casanova | |
| 2017/0205001 A1 | * | 7/2017 | Logan | F16L 5/08 |

OTHER PUBLICATIONS

Chinese Application No. CN201780061104, Office Action and Search Report dated Mar. 11, 2020.

* cited by examiner

CABLE GLAND COMPRISING A SLIP ON GROMMET

CROSS-REFERENCE TO RELATED APPLICATIONS

This application claims the benefit of the filing date of international PCT Application No. PCT/EP2017/075184, filed on Oct. 4, 2017 that in turn claims priority to Swiss Patent Application No. CH 01386/16, filed on Oct. 17, 2016, which are hereby incorporated by reference in their entirety.

FIELD OF THE INVENTION

The present invention relates to a cable gland.

BACKGROUND OF THE INVENTION

In applications in the railway sector, multi-core, thick, relatively flexible cables which have to be tailored to bridge the distance are usually used for establishing power-supply and signaling connections between individual carriages and/or traction units and/or locomotives of a train. Said tailoring is usually difficult on account of problems of space. This is true particularly for the requisite cable glands with which the ends of the cable are inserted into the housings of the parts which are to be connected and are screwed there. A good adhesive between cable and grommets is fundamental to ensure fixation (strain relief) and sealing of cables as used in various technical application.

US2014090887A, published on Apr. 3, 2015 by the same applicant, relates to a cable gland for a cable, comprising an outer shield, a cable sleeve enclosing the outer shield and an anti-kink grommet which is injection molded externally onto the cable sleeve and has stop means for the cable gland. Simple and reliable contact is achieved in that the cable gland has a substantially hollow cylindrical electrically conductive cable gland body which is pushed from one side as far as the stop means over the anti-kink grommet and projects over the anti-kink grommet with the end opposite the stop means, and has a union nut which can be screwed on the cable gland body and is pushed from the other side as far as the stop means over the anti-kink grommet, and has an electrically conductive substantially hollow cylindrical contact ring which can be pushed over the cable in a contacting manner into the projecting end of the cable gland body and is designed for receiving and fastening the outer shielding of the cable with contact.

U.S. Pat. No. 4,797,513A, published on Jun. 8, 1989 by Yazaki Crop., relates to an improvement of noise prevention and waterproof effects and simultaneously wiring workability of a funnel-shaped grommet used for wiring a wire bundle or a cable through a panel, a sealing material is put into the grommet from above to fill a space between a small-diameter cylindrical portion of the grommet and the wire bundle and gaps between wires. The sealing material is a two-liquid polyurethane resin based bonding agent or a nitrile rubber based bonding agent.

DE10200604968983, published by Sumito Electric Bordnetze GmbH on Feb. 27, 2008, relates to a method involving pressing a lower tubular section of a nozzle on a wiring harness with its fixed wrapping by two semi-circular lining units. The units are removed according to the hardness of a sealing compound. The nozzle is lifted according to the compound hardness and the removal of the units such that the deformation of the section and a frustum-like section of the nozzle results from lifting to set a position, in which diameter of the section corresponds to an upper tubular section. The diameter is set by the hardened compound within the section.

US2001008330A, published on Jul. 19, 2001 by Sumito Wiring Systems, relates to a sealing grommet that includes a grommet body with a sealant reservoir and a sealant drain portion. The grommet body has an outer peripheral wall, a panel engagement recess formed on the outer peripheral surface of the outer peripheral wall, and an inner peripheral wall extending inwardly of the outer peripheral wall and defining a wire harness insertion aperture inwardly thereof. The sealant reservoir is provided between the inner and outer peripheral walls, and is configured to temporarily store a sealant therein. The sealant drain portion is provided on the inner peripheral wall, and is configured to open upon deformation of the grommet body, thereby permitting the sealant to drain into the wire harness insertion aperture from the reservoir. With the above construction, the sealant can easily permeate between wires of the wire harness provided within the wire harness insertion aperture. Additionally, because the need for a sealant injection nozzle can be eliminated, a waterproof sealing operation can easily be carried out, even if the size of the sealing grommet is small.

DE3428903A1 Cable entry for a multi-conductor cable which extends through a wall around an electrically operating unit which is or can be immersed and to an electric motor or the like. A sealing body surrounds and relieves the stress on the cable and is held firmly by a holder, for example two pressed-on, truncated-conical hollow edges in the plates which clamp on the sealing body around a thickened region. The cable sheath has been removed in the first section of the sealing body, and the section is filled with a sealing compound which completely surrounds the individual conductors and completely fills the space as far as the cable sheath. In consequence, the cable end is completely closed in a particularly simple manner with respect to air, moisture and water, and the cable is mechanically fixed at the same time.

U.S. Pat. No. 5,499,823A, published on Mar. 19, 1996 by Sumito Wiring Systems, discloses a grommet including a hollow shell, a hollow retaining section, and a hollow member, the shell having a shell opening at a first end and a reduced diameter opening at a second end, and in communication with the retaining section at the second end. There is an insertion hole and a member wall, extending from said insertion hole in a direction away from the first end and toward the second end, which terminates at the inner wall of the shell. The member is in communication with said retaining section. A filler opening is provided in the member wall, and filler walls extend from the member and form a filler inlet in communication with the filler opening. The filler inlet can receive the filler which flows through the filler opening into the member and surrounds at least one elongated, generally cylindrical object located within the member and the retaining section.

U.S. Pat. No. 6,488,317B, published by Avaya Technology Corp. on Dec. 3, 2002, discloses a strain relief including a main body having a bore therein for passage of a cable, wire, conduit, hose, or similar member therethrough. A flexible elastomeric grommet is located within the bore and extends substantially along an entire length of the main body. The grommet includes a cylindrical sidewall and a plurality of spaced-apart annular ribs extending radially inwardly from the sidewall. A plurality of annular grooves are located between the annular ribs. The annular ribs have inside diameters which progressively increase along a length of the grommet in order to accommodate cables of various diameters therethrough. A silicone gel may be located in the annular grooves to improve the seal between the grommet and the cable.

Cable glands known from the prior art are often difficult to apply in a reproducible manner. In addition they are labor intensive and do not provide constant results. It is an object of the invention to provide a cable gland which overcomes the problems of the prior art.

SUMMARY OF THE INVENTION

A cable gland according to the invention comprises a grommet which is foreseen to be slipped on a cable from an end of the cable. When in position the grommet is attached to the cable by an adhesive. This takes place in that an inner space of the grommet arranged between an inner wall of the grommet and an outer wall of the cable is filled by an adhesive as described hereinafter in more detail. After the grommet is sufficiently fixed on the cable it is interconnected to a gland flange by which it is then interconnected e.g. to a housing. Good results are achieved if the grommet is fixed to the gland flange by a gland nut as described subsequently.

In a preferred variation the grommet comprises a tubular base body made from an elastic material and extending in an axial direction, hereinafter called cable gland axis, from a first outer end to a second outer end. The tubular base body has at least one flow channel, forming part of the inner space mentioned above, arranged on the inside between the first and the second outer end and extending in one or several steps in circumferential direction along an inner surface of the tubular base body. At least one filling hole extends from said flow channel radially outwards through the tubular base body. The filling hole is foreseen for filling the inner space of the tubular base body with an adhesive when arranged on a cable. A first circumferential sealing lip is arranged in the region of the first outer end and a second circumferential sealing lip is arranged in the region of the second outer end. The first and the second circumferential sealing lips are foreseen to seal the inner space of the tubular base body when mounted on a cable with respect to the cable. In addition at least one of the circumferential sealing lips is foreseen to temporarily clamp the tubular base body of the grommet with respect to the cable to prevent unwanted displacing of the cable grommet when the adhesive cures.

To attach the grommet to the gland flange by a gland nut the grommet may comprise an annular shoulder extending from an outer surface of the tubular base body circumferentially in an outward direction. In a preferred variation the at least one filling hole extends at least partially through the annular shoulder. If two filling holes are used, they are can be arranged over the circumference opposite from each other, so that the adhesive is more evenly distributed through the inner space to be filled.

It may be advantageous to tilt the sealing lips according to a displacement direction of the grommet with respect to the cable during assembly. Thereby the grommet can be slid on the cable in a simpler manner. The tilting has the advantage, that the distribution of the adhesive is generally enhanced in the process since the adhesive is more evenly spread due to the friction between the grommet on one hand and the cable on the other hand. Preferably, both sealing lips are placed at the region of the outer ends of the grommet facing away from the displacement. In that way, if the grommet is displaced in the direction of the displacement direction the sealing lips maintain a more abiding sealing effect during the movement.

At least one of the circumferential sealing lips may comprise a venting cut-out allowing during filling of the inner space excessive air and/or excessive adhesive to be pushed out to support the filling of the inner space in the grommet with adhesive. The venting cut-out is preferably designed in a way that if pressure is built up in the grommet due to the filling with adhesive the sealing lip on which the venting cut-out is placed is slightly lifted in the region of the venting cut-out in order to allow excessive air or adhesive to be pushed out.

After the venting process which causes the pressure again to fall, the sealing lip closes and tightly seals the grommet over the circumference.

The form of the at least one flow channel may differ from variation to variation. In a preferred variation the at least one flow channel has a form of an annular ring extending around the cable gland axis. Alternatively or in addition, the flow channel may comprise at least one helical section. If appropriate, combinations of different forms of flow channel geometries are possible, such as e.g. a combination of an annular flow channel with one or more multiple helix structured flow channels. If more than one flow channel is present the flow channels can intercross with each other e.g. forming a pattern.

In case of presence of a gland flange in combination with a gland nut it is advantageous to clamp the annular shoulder in the axial direction of the cable gland axis between gland flange and the gland nut. If appropriate first locking means can be foreseen on the tubular base body which in mounted position interlock with second locking means arranged at the gland flange thereby prohibiting an unwanted angular displacement of the grommet in respect to the gland flange. In a variation at least one first locking means extends from the outer surface of the tubular body in the form of a tooth foreseen to engage with at least one respective second locking means in the form of key ways of the gland flange.

The grommet may be made from one part, however, alternatively also a grommet comprising multiple parts that are assembled together to form in the assembled state a grommet according to the invention is possible. This may be advantageous in terms of manufacturing reasons and costs. Therefore, the grommet may e.g. comprise a front part and a rear part which are interconnectable with respect to each other in the direction of the cable gland axis. Subsequently, in the case of a front part and a rear part, the flow channel may comprise a front section arranged at the front part of the grommet and a rear section arranged at the rear part of the grommet. This is advantageous, since both parts, front and rear part, are glued and secured together more thoroughly if both parts have a section adjacent to the flow channel filled with adhesive. In addition to that, it is further advantageous that if first locking means are present, the front part and the rear part of the grommet each have a first locking means which are aligned to one another.

During filling of the grommet with adhesive, the adhesive is preferably pressed first through the at least one filling hole in the flow channel(s) distributing the adhesive over the circumference of the cable. If the flow channels are filled the pressure rises and the adhesive may consequently be pressed further between the remaining circumferential surfaces between the cable and the grommet until the sealing lips are reached. Preferably, the sealing lips are hereby designed in a way that the internal pressure built-up results in an enhanced sealing property of the seal to the outside environment. This can be achieved by a tilt angle directing to the inside. In case the above mentioned venting cut-outs are present, the grommet may be filled until excessive adhesive is pressed out through the venting cut-out, hence visually indicating, that the adhesive has traveled through the larger part of the available inner space and therefore optimally bonding the grommet to the cable. This effect is even more pronounced if the venting cut-out is placed not at the same circumferential position as the filling hole but at a position that has optimally a maximal possible angle to the filling hole, respective the adjacent filling holes. In that way the adhesive reaches the venting cut-out at a point when the adhesive has not only filled the space in an axial direction but also traveled in the best case around the full circumference of the cable.

If necessary, a support fixture may be used during filling to prevent a deformation of the grommet during injection of the adhesive.

The grommet is preferably produced by injection molding of rubber type plastic material to form an elastically deformable grommet. For the adhesive, good results can be achieved by using at least one material out of the group of the following materials: polyurethane, silicone, siliane modified polymers.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
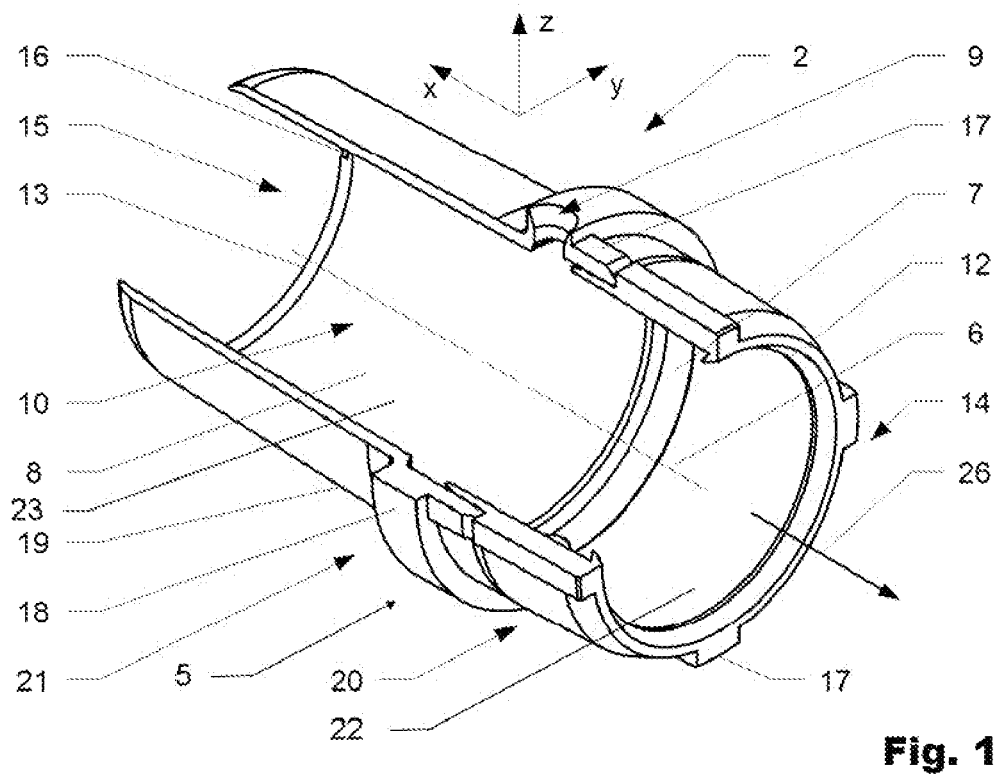
FIG. 1 A first variation of a grommet according to the invention in a partly sectionized perspective view.
Figure 2:
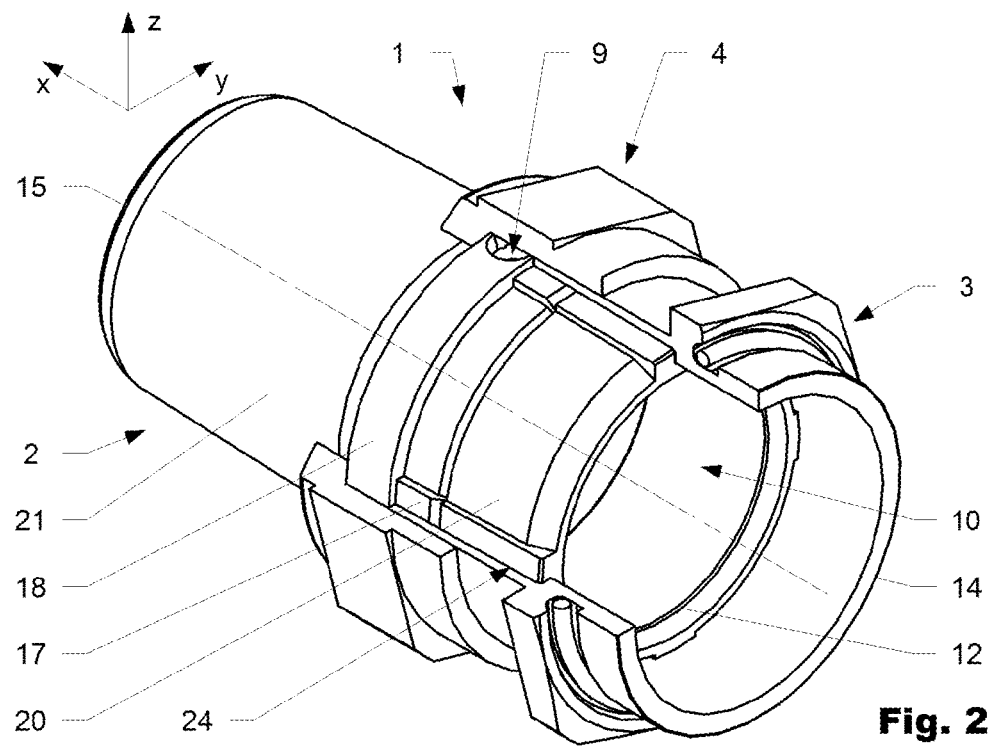
FIG. 2 A partly sectionized perspective view of a cable gland according to the invention with the grommet according to FIG. 1.

FIG. 1 and FIG. 2 show a first variation of the invention according to claim 1. In FIG. 1 the grommet 2 is shown having a front and rear part 20, 21 which are both essentially tubular. From an outer surface 19 of the rear part 21 of the grommet 2 an annular shoulder 18 is extending in a radial direction in which a filling hole 9 is placed that is interconnected to a flow channel 7 and an inner space 10 of the grommet 2. The annular shaped flow channel 7 comprises a front section 22 arranged at the front part 20 and rear section 23 arranged at the rear part 21 of the grommet 2. A first circumferential sealing lip 12 is arranged on the front part 20 of the grommet 2 in the region of the first outer end 14 of the grommet 2. A second circumferential sealing lip 13 is arranged on the rear part 21 of the grommet 2 in the region of the second outer end 15. Both sealing lips 12, 13 seal the inner space 10 when the grommet is mounted on a cable with respect to the cable (not shown here). The second circumferential sealing lip 13 comprises one venting cut-out 16 which allows excessive air and/or excessive adhesive to be pushed out during filling of the grommet 2 with adhesive.

The direction in which the individual sealing lips 12, 13 are facing is preferably chosen according to a displacement direction 26. The displacement direction 26 is the direction in which the grommet 2 is displaced while being filled with adhesive in the assembling process. The displacement further has the advantage, that the distribution of the adhesive is generally enhanced in the process since the adhesive is more evenly spread due to the friction between the grommet 2 on one hand and the cable on the other hand. In the shown case, the first circumferential sealing lip 12 is placed at the region of the outer end 14 and is tilted inwards and away from the displacement direction 26. The second circumferential sealing lip 13 is also tilted away from the displacement direction 26 and is placed at the remaining outer end 15. Preferably, the venting cut-out 16 is hereby placed on the sealing lip 13 that is facing away from the displacement direction 26.

Figure 3:
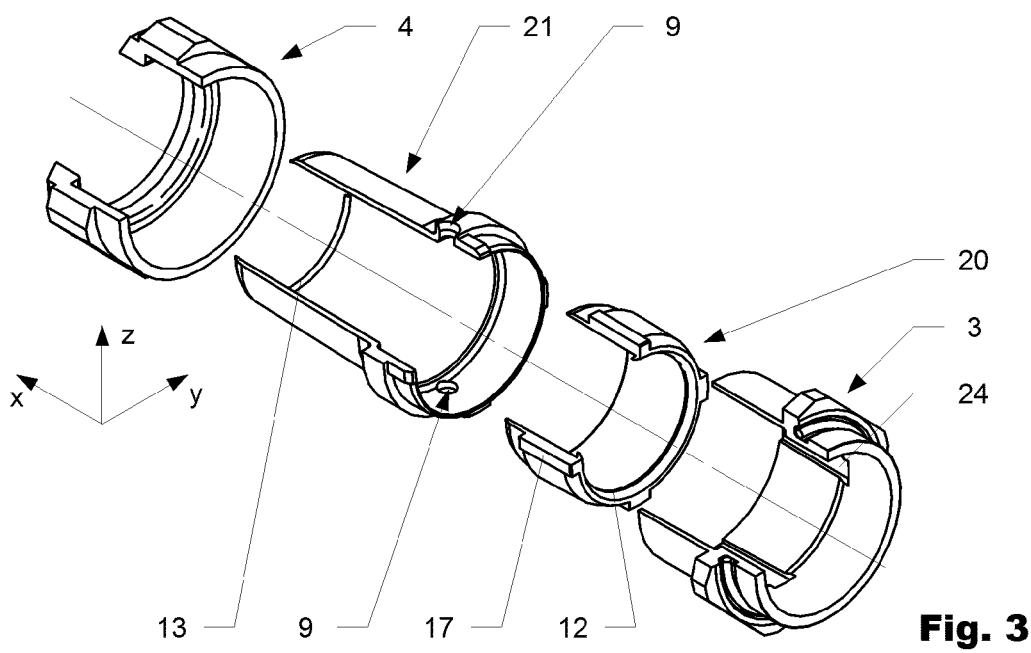
FIG. 3 A disassembled and partly sectionized perspective view of the cable gland according to FIG. 2.

The front and the rear part 20, 21 both comprise multiple first locking means 17 which prohibit an angular displacement of the grommet 2 in respect to gland flange 3. The first locking means 17 extends from the outer surface 19 of the tubular body 5 (formed by the front and the rear part 20, 21 of the grommet 2) in the form of multiple teeth which are foreseen to engage with respective second locking means 24 in form of key ways of a gland flange 3. However, it is understood that other locking means instead of key ways and protrusions are also possible. Furthermore, the first locking means 17 may be key ways and the second locking means 24 may be protrusions. This is illustrated in FIG. 2 which shows the variation of the grommet 2 according to FIG. 1 assembled with a gland flange 3 and a gland nut 4. Furthermore, FIG. 3 illustrates the same configuration in a disassembled state. The gland nut 4 is secured on the gland flange 3 by means of a thread (not shown here) and further serves to secure the assembly and enhance the overall seal effect.

Figure 4:
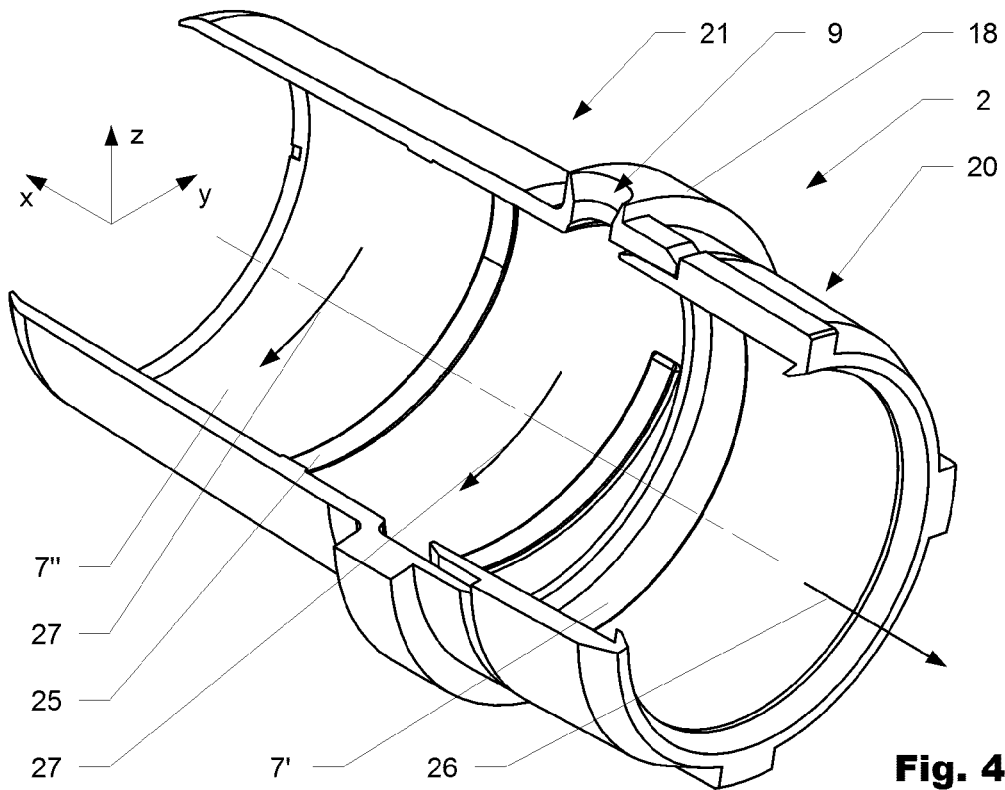
FIG. 4 A second variation of a grommet according to the invention in a partly sectionized perspective view.

FIG. 4 illustrates another variation of the grommet 2. The grommet differs from the variation shown in FIG. 1 in form of the flow channels 7. In this variation, the grommet 2 comprises multiple flow channels: An annular flow channel 7' and flow channels 7" that are formed like a helix. The outer walls of the helix formed flow channels 7" form a conveying structure 25 for the adhesive to be transported in the direction opposite of the displacement direction if the grommet 2 is during the assembly and after the filling process displaced in the displacement direction 26. Hence, the helix form enhances the distribution of the adhesive over the inner space 10 (as indicated by the arrows 27) during axial displacement of the grommet on the cable. Preferably, a venting cut-out 16 is placed at the end of a helix formed flow channel 7".

The words used in the specification are words of description rather than limitation, and it is understood that various changes may be made without departing from the spirit and scope of the invention.

The invention claimed is:

1. A cable gland with a grommet comprising
   a. a tubular base body made from an elastic material and extending in a direction of a cable gland axis from a first outer end to a second outer end,
   b. the tubular base body having at least one flow channel arranged between the first outer end and the second outer end and extending in a circumferential direction along an inner surface of the tubular base body,
   c. at least one filling hole extending from the at least one flow channel radially outwards through the tubular base body to fill an inner space of the tubular base body between an inner wall of the grommet and an outer wall of the cable with an adhesive, wherein the grommet is made of rubber type plastic material, and
   d. a first circumferential sealing lip arranged in a region of the first outer end and a second circumferential sealing lip arranged in a region of the second outer end to seal the inner space of the tubular base body when mounted on a cable with respect to the cable.

2. The cable gland according to claim 1, wherein the grommet comprises an annular shoulder extending from an outer surface of the tubular base body in an outward direction.

3. The cable gland according to claim 2, wherein the at least one filling hole extends at least partially through the annular shoulder.

4. The cable gland according to claim 1 wherein at least one of the first circumferential sealing lip and the second circumferential lip comprises at least one venting cut-out configured to allow during filling of the inner space one or more of excessive air and excessive adhesive to be pushed out during filling of the grommet with the adhesive.

5. The cable gland according to claim 1 wherein the at least one flow channel has a form of one or more of an annular ring and a helix structure around the cable gland axis.

6. The cable gland according to claim 1 wherein the cable gland comprises a gland flange interconnectable to the grommet.

7. The cable gland according to claim 6, wherein the cable gland comprises a gland nut configured to fasten the grommet to the gland flange.

8. The cable gland according to claim 7, wherein an annular shoulder of the grommet is in a mounted position clamped between the gland flange and the gland nut.

9. The cable gland according to claim 6 wherein the tubular base body comprises at least one first locking means configured to prohibit an angular displacement of the grommet in respect to the gland flange.

10. The cable gland according to claim 9 wherein the at least one first locking means extends from an outer surface of the tubular base body in a form of a tooth configured to engage with a respective second locking means of the gland flange.

11. The cable gland according to claim 1 wherein the grommet has a front part and a rear part which are interconnectable with respect to each other in the direction of the cable gland axis.

12. The cable gland according to claim 11 wherein the at least one flow channel comprises a front section arranged at the front part of the grommet and a rear section arranged at the rear part of the grommet.

13. The cable gland according to claim 11 wherein the front part and the rear part of the grommet each have a first locking means which are aligned to one another.

14. The cable gland according to claim 1 wherein the first circumferential sealing lip or the second circumferential sealing lip are tilted away from a displacement direction of the grommet.

15. The cable gland according to claim 1 wherein the grommet is made by injection molding.

16. The cable gland according to claim 1 wherein a support fixture is used during injection of the adhesive to prevent a deformation of the grommet.

17. The cable gland according to claim 1 wherein the adhesive is made of polyurethane or silicones or siliane modified polymers.

* * * * *